US012446997B1

(12) United States Patent
Taylor et al.

(10) Patent No.: US 12,446,997 B1
(45) Date of Patent: Oct. 21, 2025

(54) HANDLE FOR AN ORAL HEALTH DEVICE

(71) Applicant: Fresh Health Inc., Mountain View, CA (US)

(72) Inventors: Machiko Taylor, Alameda, CA (US); Bruce Michael Schena, Menlo Park, CA (US); Brian Hachtmann, Mountain View, CA (US)

(73) Assignee: Fresh Health Inc., Mountain View, CA (US)

( * ) Notice: Subject to any disclaimer, the term of this patent is extended or adjusted under 35 U.S.C. 154(b) by 0 days.

(21) Appl. No.: 18/932,392

(22) Filed: Oct. 30, 2024

(51) Int. Cl.
*A61C 17/02* (2006.01)

(52) U.S. Cl.
CPC ...... *A61C 17/0202* (2013.01); *A61C 17/0211* (2013.01)

(58) Field of Classification Search
CPC .......... A61C 17/00; A61C 17/02–0202; A61C 17/0211; A61C 17/16; A61C 17/22–30; A61C 17/36
See application file for complete search history.

(56) References Cited

U.S. PATENT DOCUMENTS

| | | | | | |
|---|---|---|---|---|---|
| 2,492,966 | A | * | 1/1950 | Ckola | A61C 17/30 433/125 |
| 2,618,161 | A | * | 11/1952 | Mason | A61C 17/26 476/27 |
| 3,242,346 | A | * | 3/1966 | Skoubo | H02P 23/16 327/512 |
| 4,106,501 | A | * | 8/1978 | Ozbey | A61C 17/0211 433/80 |
| 4,120,602 | A | * | 10/1978 | Megnint | F03B 3/183 60/398 |
| 4,289,971 | A | * | 9/1981 | Ueda | F03B 13/105 405/75 |
| 4,464,580 | A | * | 8/1984 | Miller | F16J 15/342 290/43 |
| 9,998,046 | B2 | * | 6/2018 | Perriere | F03D 7/028 |
| 10,595,627 | B1 | * | 3/2020 | Laurent | A46B 13/06 |
| 2008/0136191 | A1 | * | 6/2008 | Baarman | F03B 3/04 290/54 |
| 2011/0290052 | A1 | * | 12/2011 | Sappenfield | A46B 13/003 475/331 |
| 2020/0253369 | A1 | * | 8/2020 | De Gentile | A46B 11/06 |

FOREIGN PATENT DOCUMENTS

TW 202137948 A * 10/2021

* cited by examiner

*Primary Examiner* — Rachel T Sippel
*Assistant Examiner* — Jacqueline M Pinderski
(74) *Attorney, Agent, or Firm* — Van Pelt, Yi & James LLP

(57) ABSTRACT

A handle for an oral health device is disclosed. The handle includes a stationary body, a hydraulic turbine coupled to the stationary body, a manifold selector disc coupled to the hydraulic turbine, and a manifold disc that includes a plurality of holes. The stationary body includes a plurality of vanes. The hydraulic turbine includes a plurality of blades. The manifold selector disc is configured to rotate when the hydraulic turbine rotates. The manifold selector disc includes a gateway. The manifold selector disc is configured to fully expose, as the hydraulic turbine rotates, a first hole of the plurality of holes or partially expose a first hole of the plurality of holes and a second hole of the plurality of holes.

28 Claims, 16 Drawing Sheets

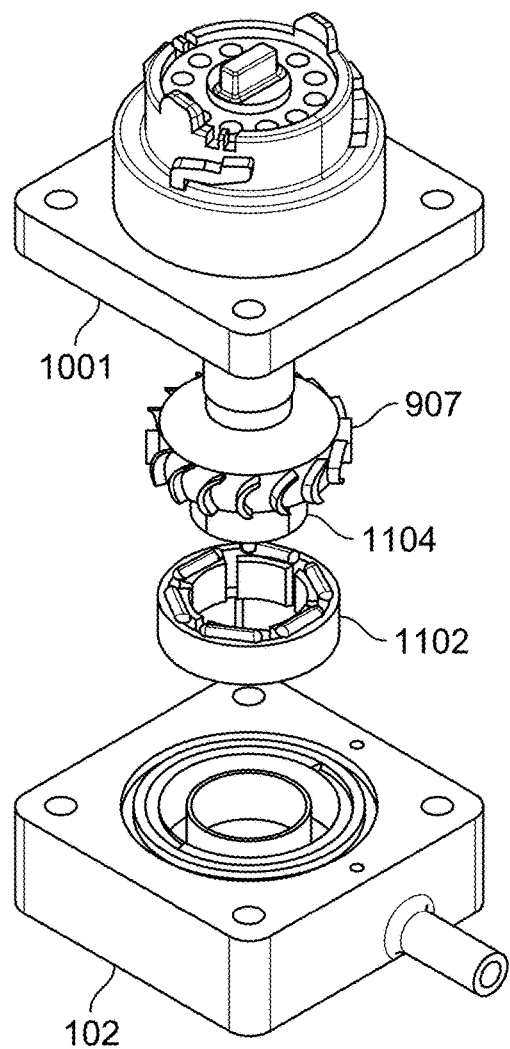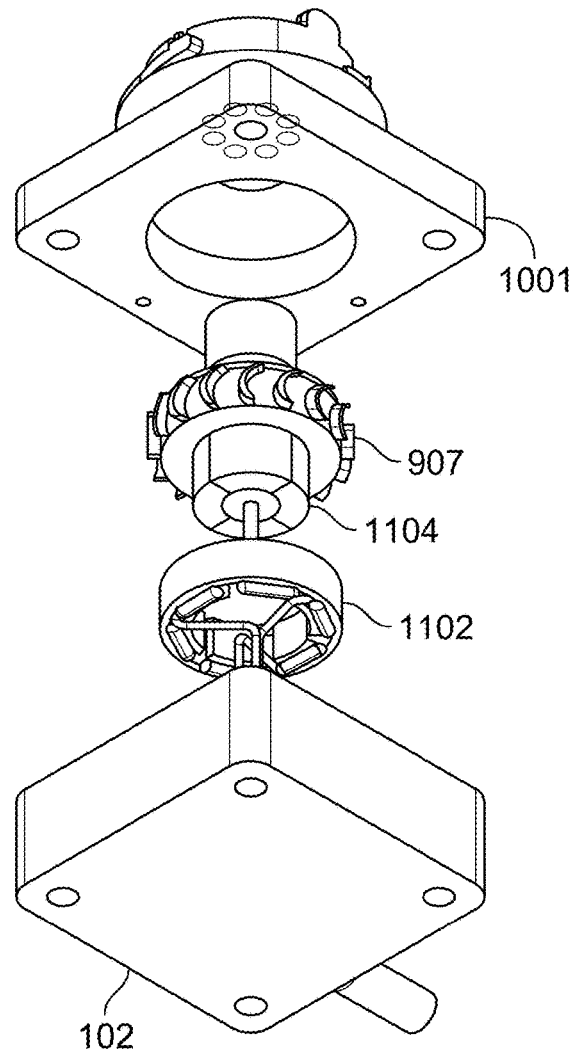
FIG. 11A  FIG. 11B ously provide jets of fluid to different parts of a user's mouth. Currently, an electric motor is typically provided in a handle that selects which parts of the user's mouth to which the jets of fluid are provided. However, an electric motor may malfunction over the lifetime of an oral health device. Due to the complexity of integrating the motor into the handle, it may be easier, but more costly, to replace the handle with a new motor and other handle components than it is to individually repair or replace to motor. Regardless of whether the handle is replaced, the motor is repaired, or the motor is replaced, the oral heath device is dependent on the motor to function properly.

HANDLE FOR AN ORAL HEALTH DEVICE

BACKGROUND OF THE INVENTION

Oral health devices have been developed that selectively provide jets of fluid to different parts of a user's mouth. Currently, an electric motor is typically provided in a handle that selects which parts of the user's mouth to which the jets of fluid are provided. However, an electric motor may malfunction over the lifetime of an oral health device. Due to the complexity of integrating the motor into the handle, it may be easier, but more costly, to replace the handle with a new motor and other handle components than it is to individually repair or replace to motor. Regardless of whether the handle is replaced, the motor is repaired, or the motor is replaced, the oral heath device is dependent on the motor to function properly.

BRIEF DESCRIPTION OF THE DRA WINGS

Various embodiments of the invention are disclosed in the following detailed description and the accompanying drawings.

Figure 4C:
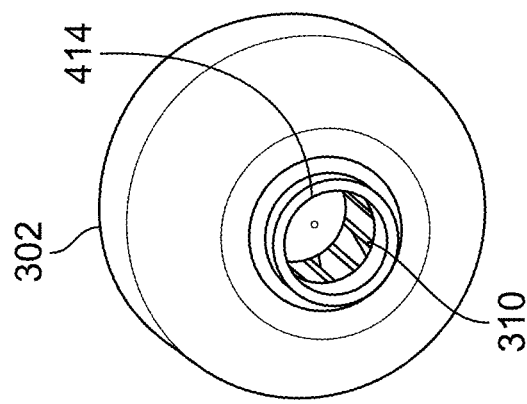
Figure 4B:
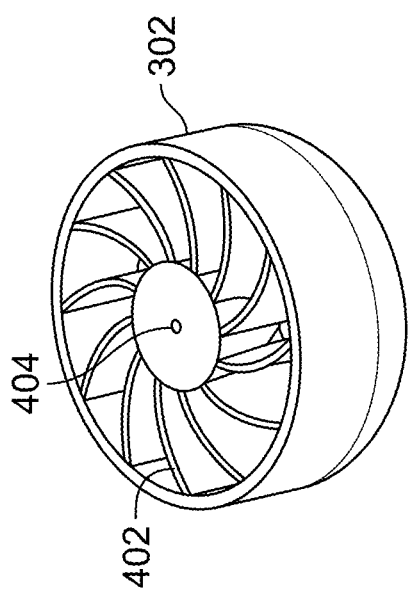
Figure 4A:
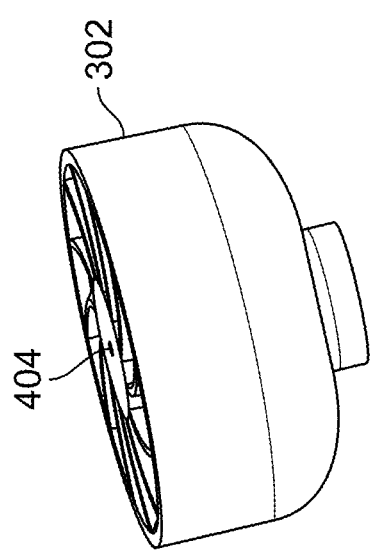

FIGS. 4A, 4B, and 4C depict perspective views of the bottom portion of a handle in accordance with some embodiments.

Figure 5A:
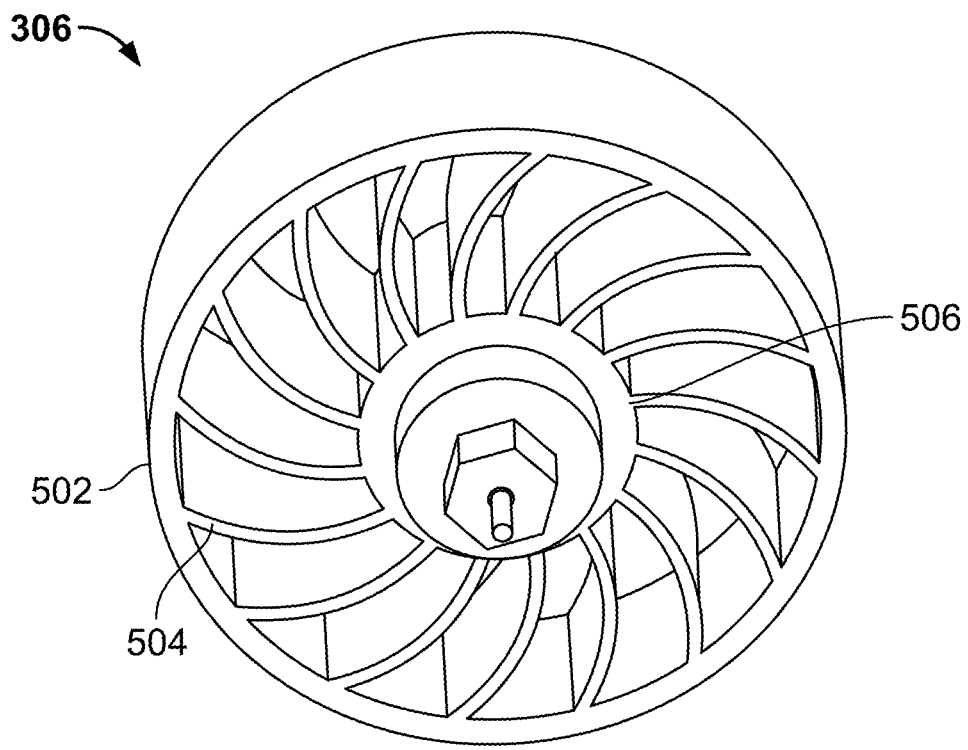
Figure 5B:
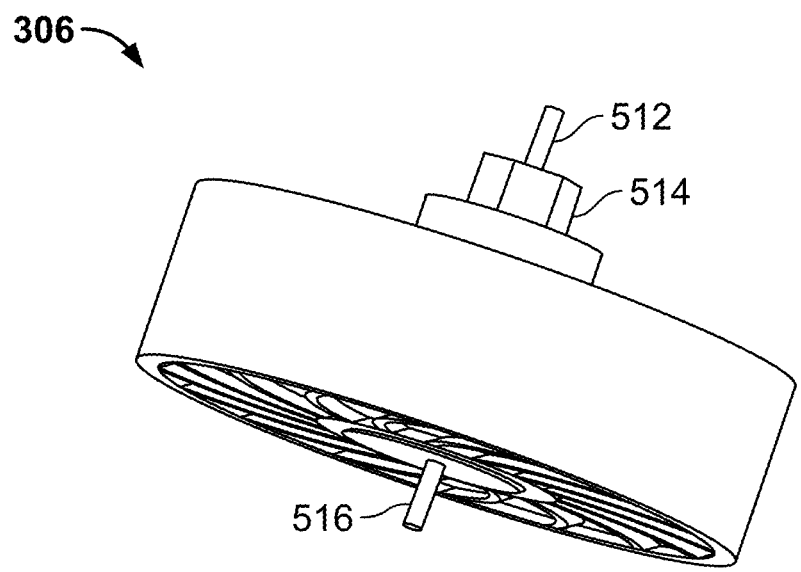

FIGS. 5A and 5B depict perspective views of a hydraulic turbine in accordance with some embodiments.

Figure 6:
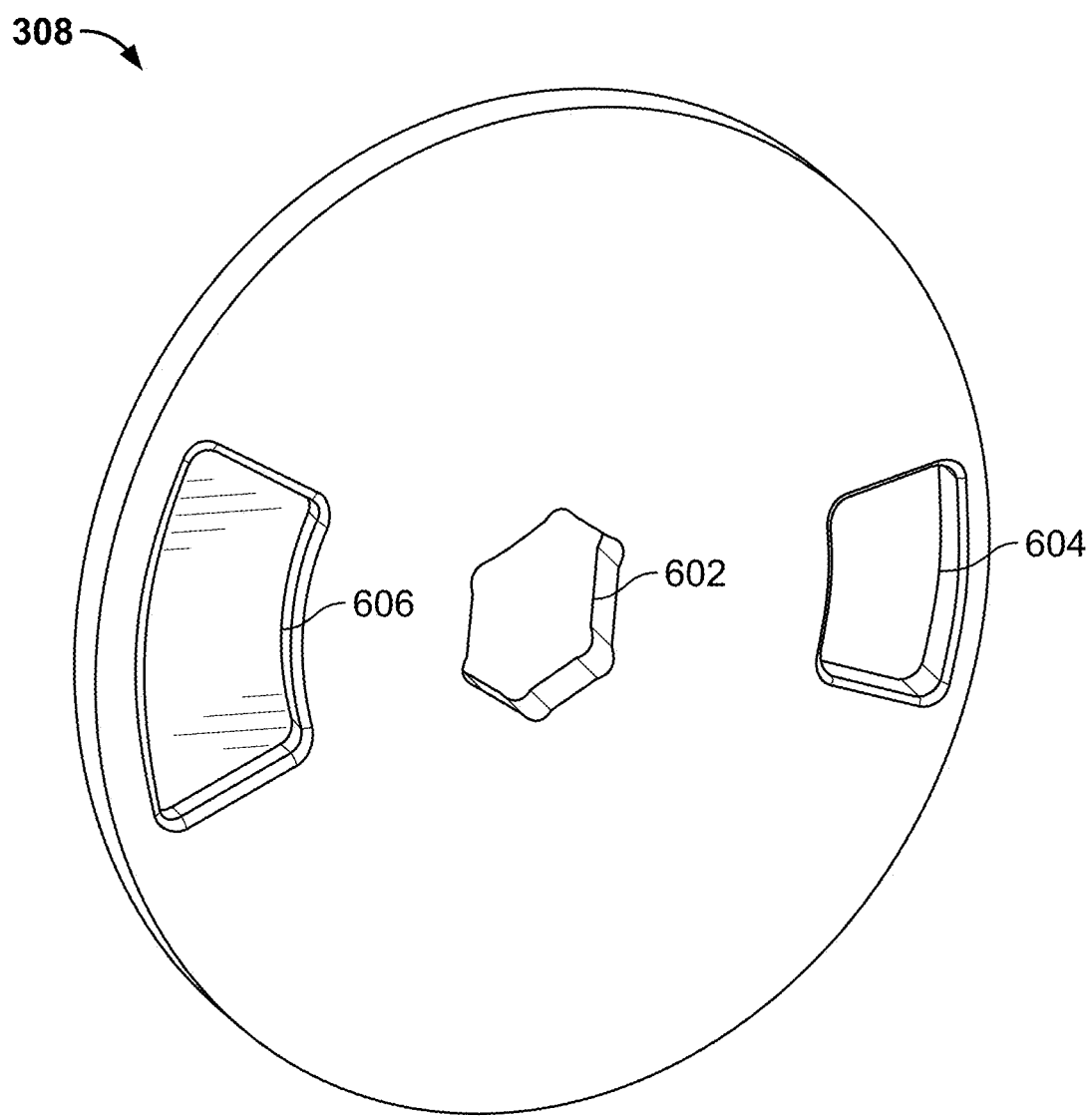

FIG. 6 depicts a perspective view of a manifold selector disc in accordance with some embodiments.

Figure 7A:
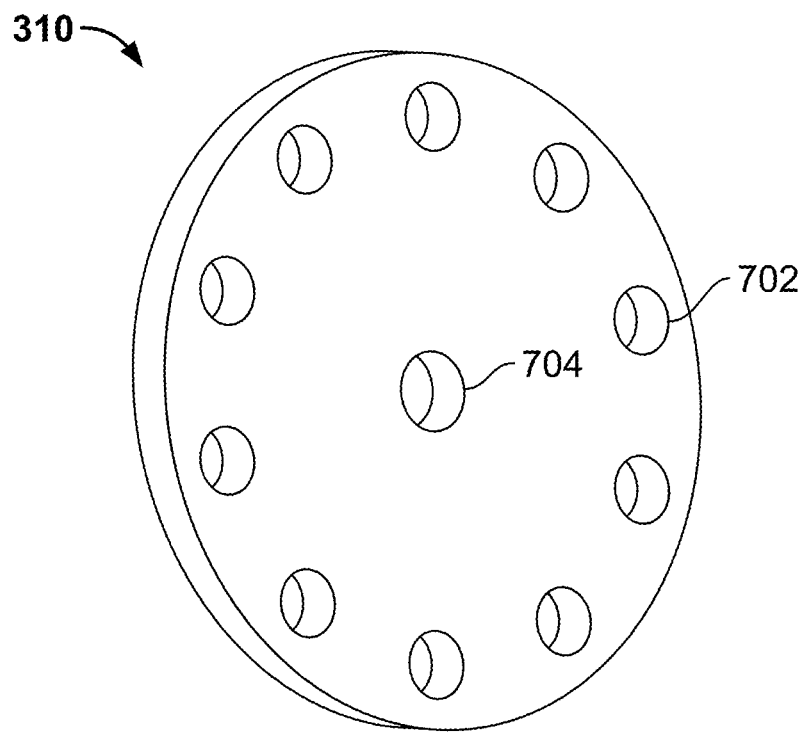
Figure 7B:
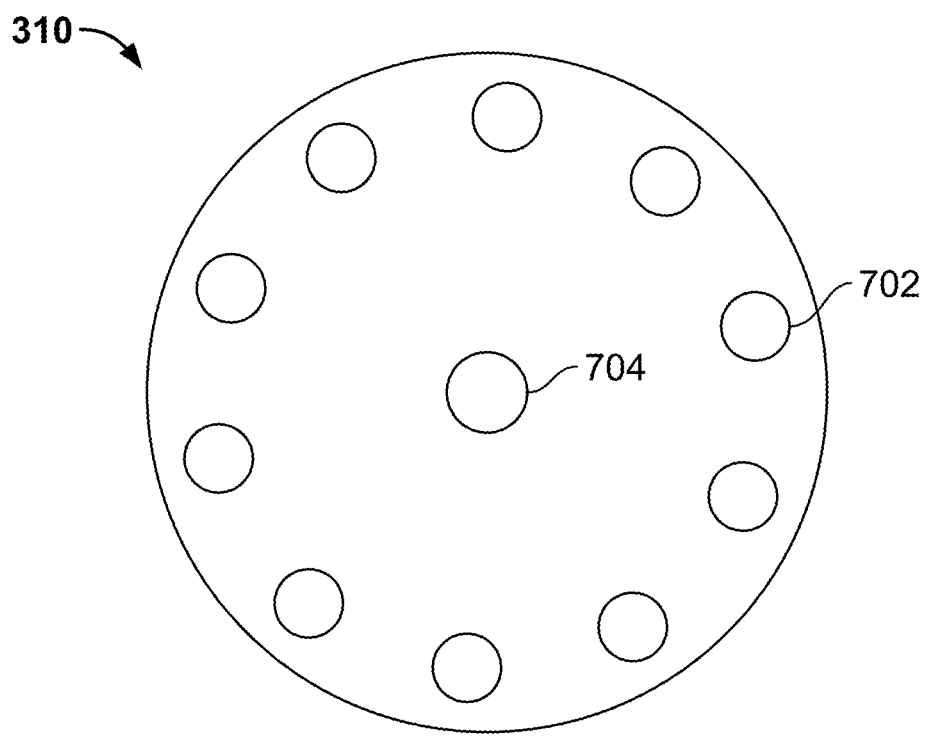

FIGS. 7A and 7B depict perspective views of a low friction material in accordance with some embodiments.

Figure 8C:
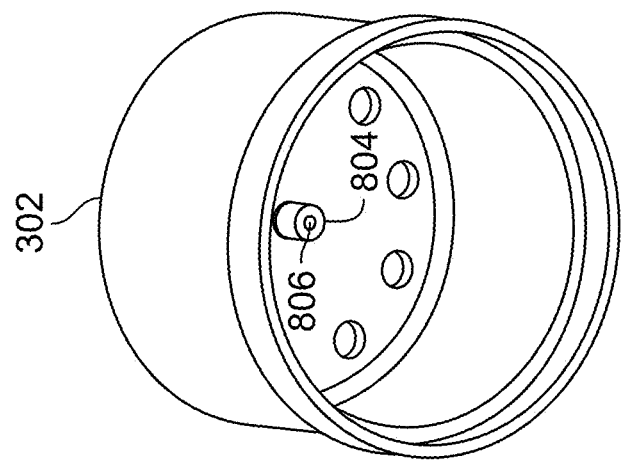
Figure 8B:
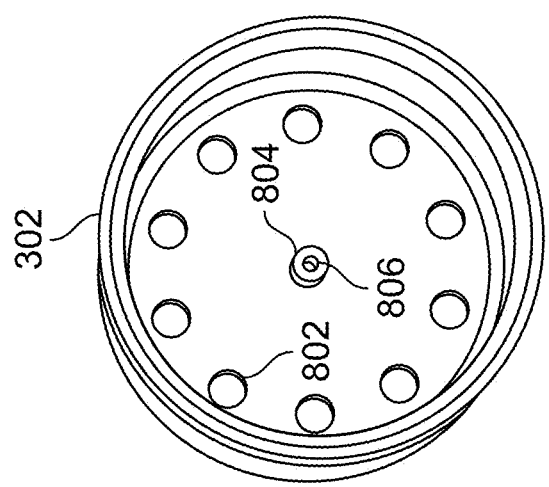
Figure 8A:
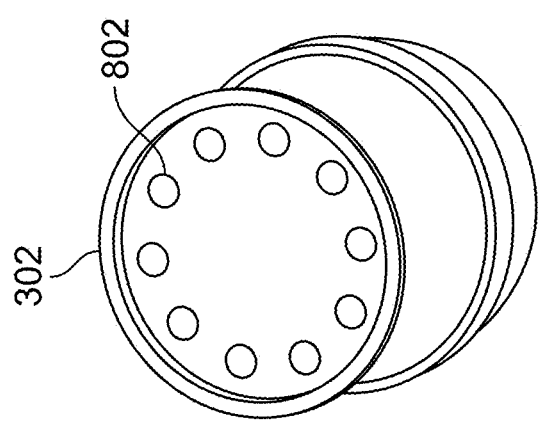

FIGS. 8A, 8B, and 8C depict perspective views of a top portion of a handle in accordance with some embodiments.

Figure 9A:
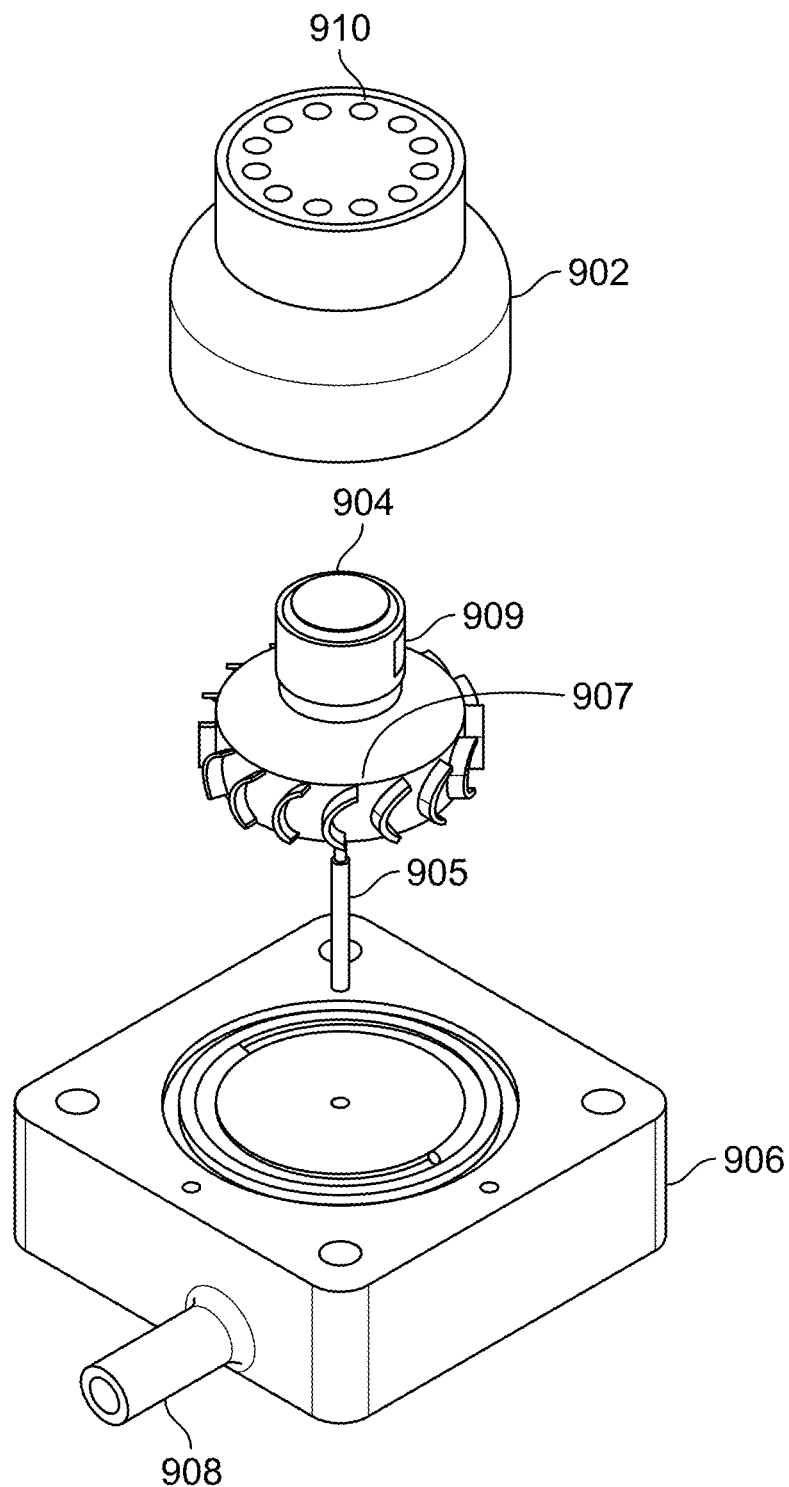

FIG. 9A depicts handle components in accordance with some embodiments.

Figure 9B:
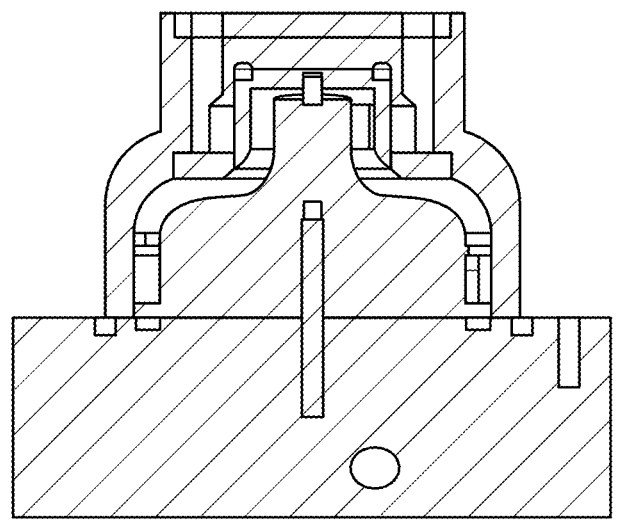

FIG. 9B depicts a side view of the handle components in accordance with some embodiments.

Figure 9C:
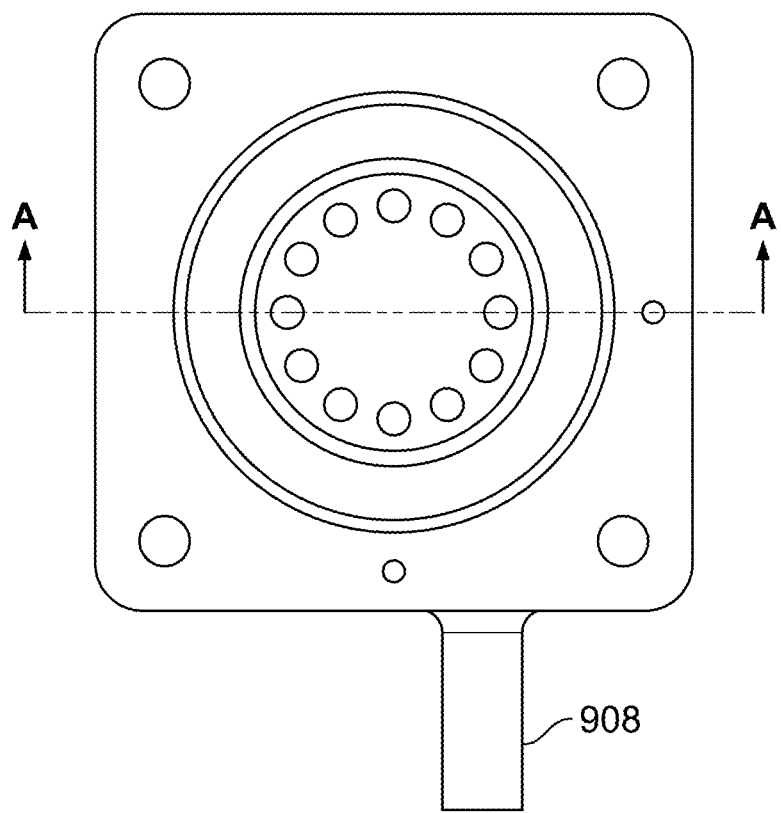

FIG. 9C depicts a top-down view of the handle components in accordance with some embodiments.

Figure 9D:
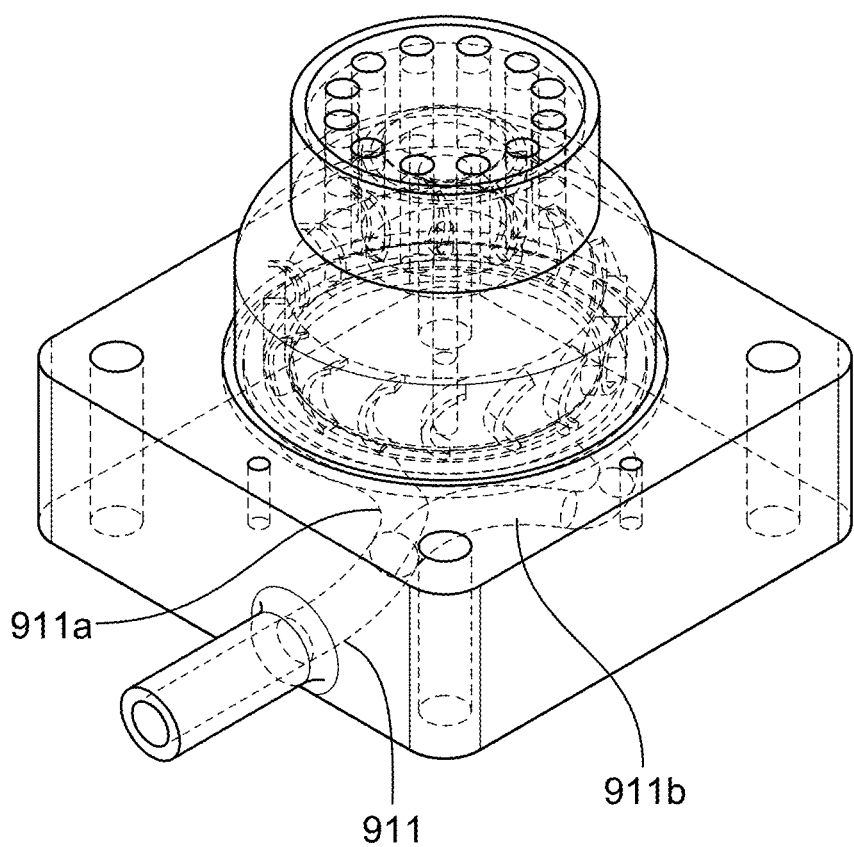

FIG. 9D depicts a perspective view of the handle components in accordance with some embodiments.

Figure 10A:
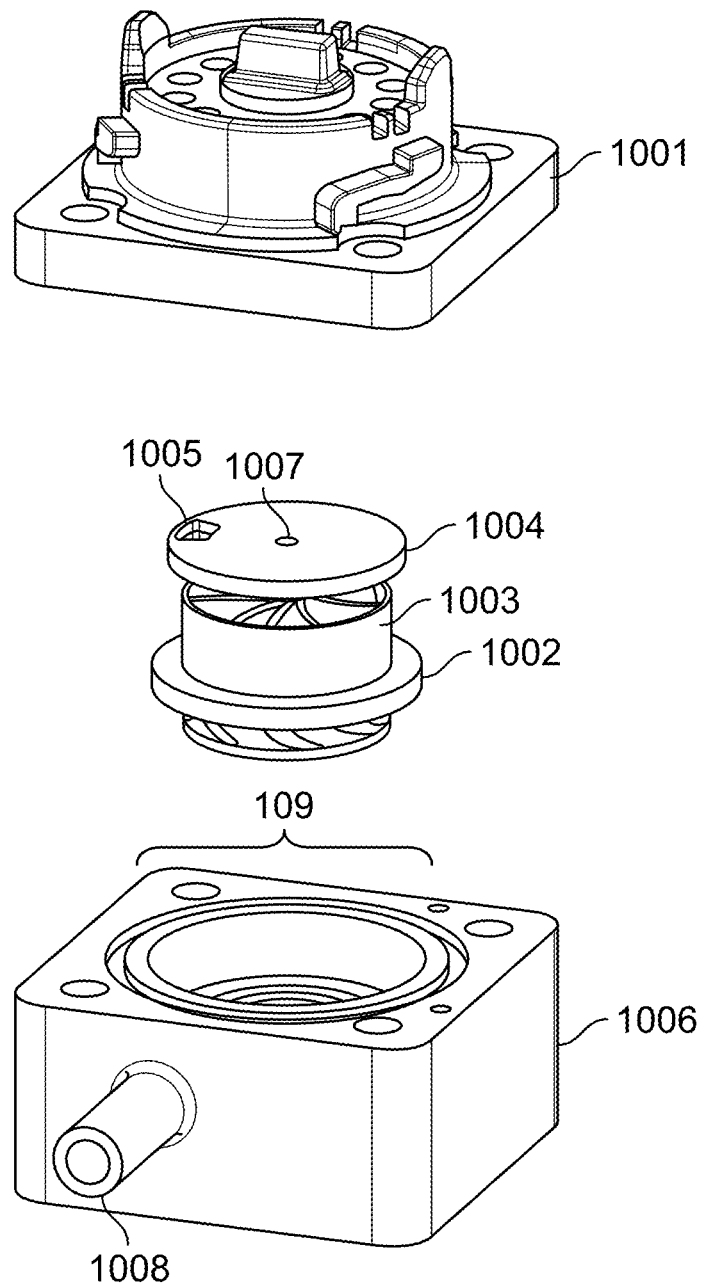

FIG. 10A depicts handle components in accordance with some embodiments.

Figure 10B:
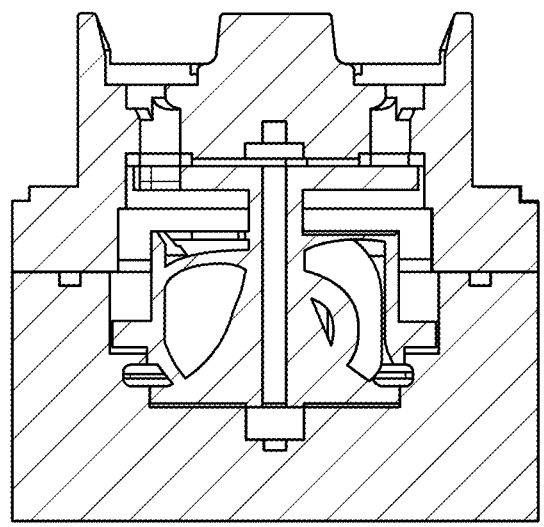

FIG. 10B depicts a side view of the handle components in accordance with some embodiments.

Figure 10C:
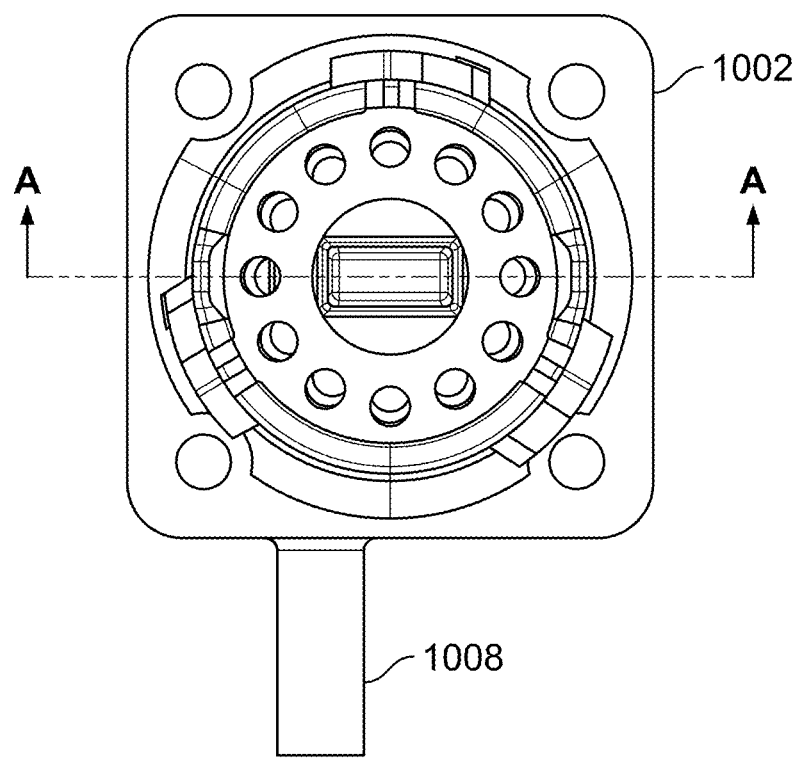

FIG. 10C depicts a top-down view of the handle components in accordance with some embodiments.

Figure 10D:
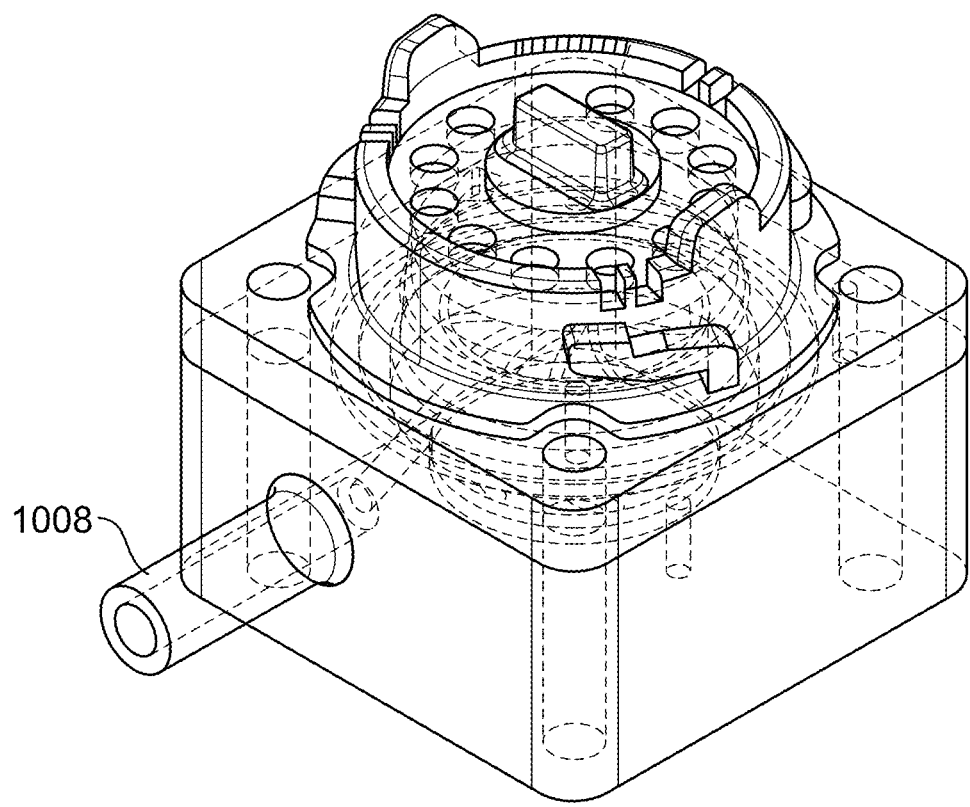

FIG. 10D depicts a perspective view of the handle components in accordance with some embodiments.

FIGS. 11A and 11B depict a perspective view of the handle components in accordance with some embodiments

DETAILED DESCRIPTION

The invention can be implemented in numerous ways, including as a process; an apparatus; a system; a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A handle for an oral health device is disclosed. The disclosed handle enables an oral health device to operate without an electric motor for a manifold switch. As a result, the disclosed oral health device is less likely to malfunction when fluid is provided to an oral insert from a fluid source via the handle.

A first end of the handle is coupled to a first end of a fluid conduit. A second end of the fluid conduit is coupled to a fluid source. The fluid source may include a base station that includes a fluid pump. The base station is coupled to a fluid reservoir. The fluid reservoir is configured to store a particular volume of fluid. When the oral health device is activated, the fluid pump causes fluid included in the fluid reservoir to be introduced into a bottom portion of the handle via the fluid conduit.

The bottom portion of the handle includes an opening. A first side of a cone (e.g., rounded cone, spiked cone) is situated opposite to the opening. The bottom portion of the handle includes a plurality of vanes. A proximal end of a vane is attached to a surface of the cone. A distal end of a vane of the plurality of vanes is attached to an inner surface of an exterior body of the stationary body.

A second side of the cone includes an opening (e.g., a hole). The second side of the cone (i.e., the face) is coupled to a first side of a hydraulic turbine via a first elongated member (e.g., a rod) of the hydraulic turbine that extends through the opening of the second side of the cone. The opening is located at a center of the face. In other embodiments, the opening is located at a different location of the face. The hydraulic turbine includes an external cylindrical structure, a plurality of blades, and an internal cylindrical body. A proximal end of a blade is attached to a surface of the internal cylindrical body. A distal end of a blade is attached to an inner surface of the external cylindrical structure of the hydraulic turbine.

Fluid is provided from the bottom portion of the handle to the hydraulic turbine. The plurality of vanes is stationary. The plurality of vanes cause the fluid to move in a particular direction as the fluid moves from the opening of the bottom portion of the handle to the hydraulic turbine. In some embodiments, the plurality of vanes cause the fluid to move in a clockwise direction. In some embodiments, the plurality of vanes cause the fluid to move in a counter-clockwise direction. As the fluid transitions from the bottom portion of the handle to the hydraulic turbine, the fluid movement created by the plurality of vanes causes the blades associated with the hydraulic turbine to rotate. In some embodiments, the blades associated with the hydraulic turbine rotate in a clockwise motion. In some embodiments, the blades associated with the hydraulic turbine rotate in a counter-clockwise motion.

A second side of the hydraulic turbine includes a key and a second elongated member. The second side of the hydraulic turbine is coupled to a first side of a manifold selector disc via the key. The key may have a plurality of different shapes, such as a triangle, a square, a rectangle, a rhombus, a trapezoid, a circle, a pentagon, a hexagon, etc. The manifold selector disc includes an opening in the center of the manifold selector disc. A shape and size of the opening is configured to match the key associated with the second side of the hydraulic turbine. When placed into the key of the hydraulic turbine, the manifold selector disc is configured to rotate together with the hydraulic turbine as the hydraulic turbine rotates.

A second side of the manifold selector disc is coupled to a first side of a low friction material. A second side of the low friction material is coupled to a first side of a manifold disc that is included in an upper portion of the handle. The low friction material reduces friction between the manifold disc and the manifold selector disc, and enables the hydraulic turbine to rotate the manifold selector disc.

The low friction material and the manifold disc include a plurality of holes. The plurality of holes associated with the low friction material and the manifold disc is arranged in a circular pattern. A number of the plurality of holes associated with the low friction material is equal to a number of the plurality of holes associated with the manifold disc. The plurality of holes associated with the low friction material align with the plurality of holes associated with the manifold disc such that when the manifold disc is situation adjacent to the low friction material, neither the plurality of holes associated with the low friction material nor the plurality of holes associated with the manifold disc appear to be obstructed, i.e., the plurality of holes overlap.

The manifold selector disc includes a gateway. The gateway may have a trapezoidal or other shape. The gateway has a size and dimension such that only one of the holes of the low friction material and the manifold disc is fully exposed when the gateway is over the hole. When transitioning between holes, the gateway is configured to expose a portion of a previously exposed hole and a portion of a next hole to be exposed.

The manifold selector disc includes a rotation balancing cutout. The rotation balancing cutout is located antipodal (diametrically opposite) to the gateway. The rotation balancing cutout has a volume that is substantially equal (within a threshold tolerance) of the volume of the gateway. This is to ensure that the manifold selector disc is balanced (e.g., prevent wobble, reduce vibration) when the manifold selector disc rotates.

The second elongated member of the hydraulic turbine is configured to fit through an opening associated with the low friction material and an opening associated with an alignment body of the manifold disc. The opening associated with the low friction material has a size and shape that is substantially equal (within a threshold tolerance) to the size and shape of the alignment body of the manifold disc. The alignment body may be a pyramid, a cube, a cylinder, a rectangular cuboid, or any other shape. The opening associated with the alignment body has a shape and size corresponding to the second elongated member of the hydraulic turbine. The opening associated with the low friction material has a dimension (e.g., radius or diameter) that is greater than the opening associated with the alignment body.

The handle is coupled to an oral insert that includes a plurality of manifolds and a plurality of fluid nozzles. During a cleaning cycle associated with the oral health device, the device is in a "cleaning" phase or a "transition" phase. During the "cleaning" phase, fluid is provided from the hydraulic turbine to a hole of the plurality of holes associated with the low friction material and the manifold disc via the gateway associated with the manifold selector disc. The hole corresponds to a manifold of the plurality of manifolds associated with the oral insert. The fluid is subsequently provided to a portion of a user's mouth that corresponds to the manifold via the plurality of fluid nozzles associated with the manifold. During the "transition phase," a portion of a currently exposed hole and a portion of a subsequent exposed hole are exposed by the gateway of the manifold selector disc. A manifold of the oral insert corresponds to the currently exposed hole and a different manifold of the oral insert corresponds to the subsequent exposed hole. Fluid is provided to the manifold of the oral insert that corresponds to the currently exposed hole and the different manifold of the oral insert that corresponds to the subsequent exposed hole when the oral health device is in the "transition" phase. The oral health device alternates between the "cleaning" phase and the "transition" phase during the cleaning cycle associated with the oral health device. In some embodiments, the cleaning cycle associated with the oral health device ends when a predetermined amount of time has passed. In some embodiments, the cleaning cycle associated with the oral health device ends when the fluid reservoir becomes empty.

Figure 1A:
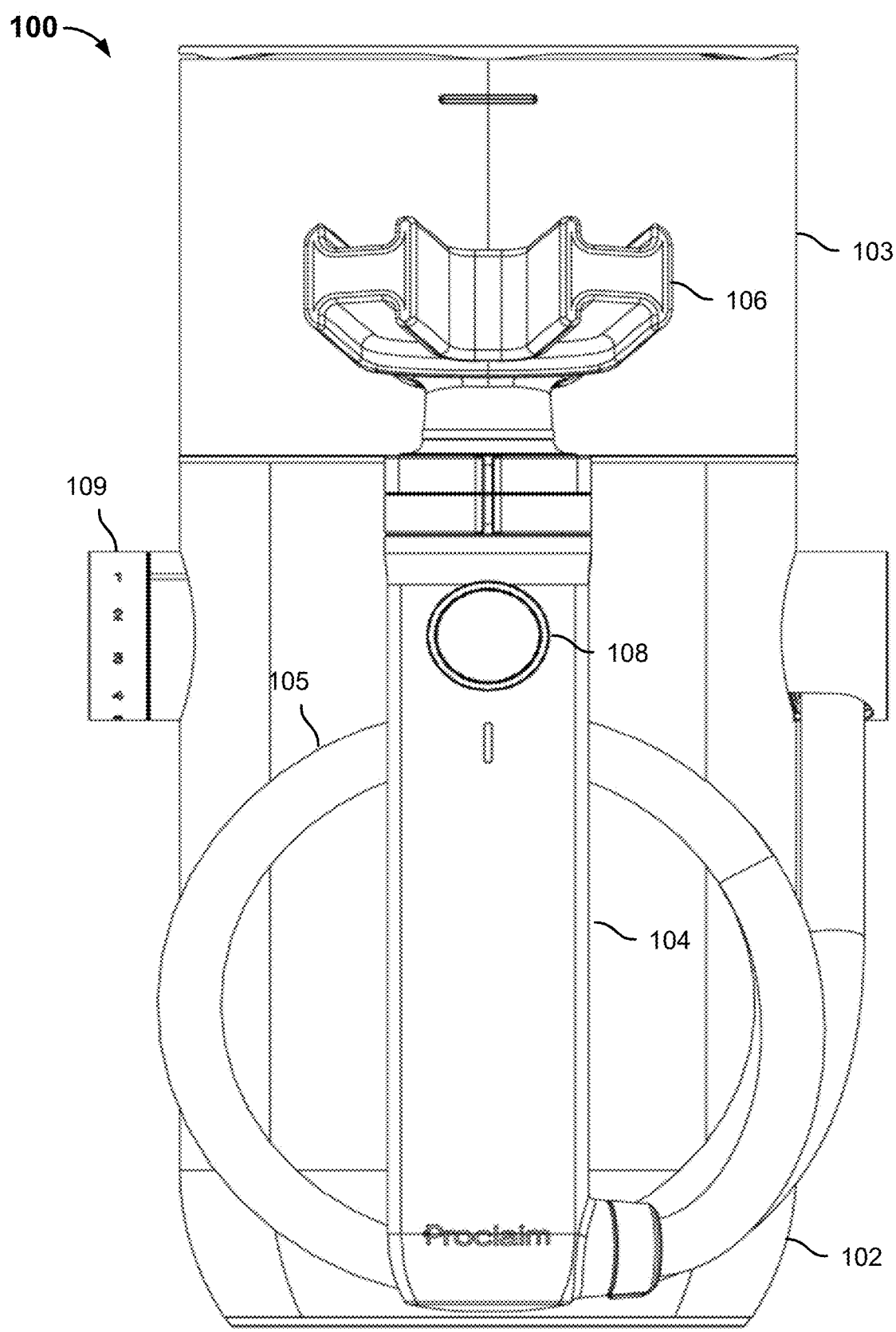
FIG. 1A is a diagram illustrating an oral health device for cleaning the oral anatomy of a user in accordance with some embodiments.

FIG. 1A is a diagram illustrating an oral health device for cleaning the oral anatomy of a user in accordance with some embodiments. In the example shown, device 100 includes a charging station 101 for handle 104, a base station 102 having a fluid reservoir 103, and a customized oral insert or mouthpiece 106 coupled to the handle 104. Base station 102 includes a fluid flow adjustment dial 109 to adjust the rate at which fluid is provided from fluid reservoir 103 to oral insert 106. A value of "1" is a "slow" rate whereas a value of "5" is a "fast" rate. One or more fluid conduits or tubes 105 may connect the fluid reservoir 103 to the handle 104 and to the mouthpiece 106. The handle 104 may comprise one or more control buttons (e.g., a start/stop button 108), as may be desirable, which may be positioned variously on the handle for ergonomic or efficient use. The fluid retained in the fluid reservoir of device 100 may be water, an antiseptic solution, a liquid medicant, flavored solutions, cleaning solutions, abrasive solutions, microbiome collection fluids, saline, a mouth wash or rinse, (e.g., containing fluoride and/or germicidal or other cleaning and/or teeth protective fluids), and/or any other desirable additive.

The oral insert 106 is comprised of a plurality of fluid nozzles that are arranged in accordance with the unique geometry of the user's oral cavity, gingival geometry, and dental structures (and any oral and/or dental devices or implants). Examples of oral and/or dental devices or implants may include, but are not limited to, permanent and removable dental restorations/prosthetics, orthodontic appliances, and etc. (e.g., crowns, bridges, implants, braces, retainers, dentures, and the like). Each of the fluid nozzles (orifices) may be positioned to target a specific dental feature. Inside oral insert 106, the fluid nozzles may be connected to one or more internal manifolds. The inlets of these manifolds may extend from the back of the mouthpiece (or where desirable for ergonomic and/or efficient use)

in the form of a standardized connector, to which handle 104 and/or one or more tubes 105 may be connected.

Figure 1B:
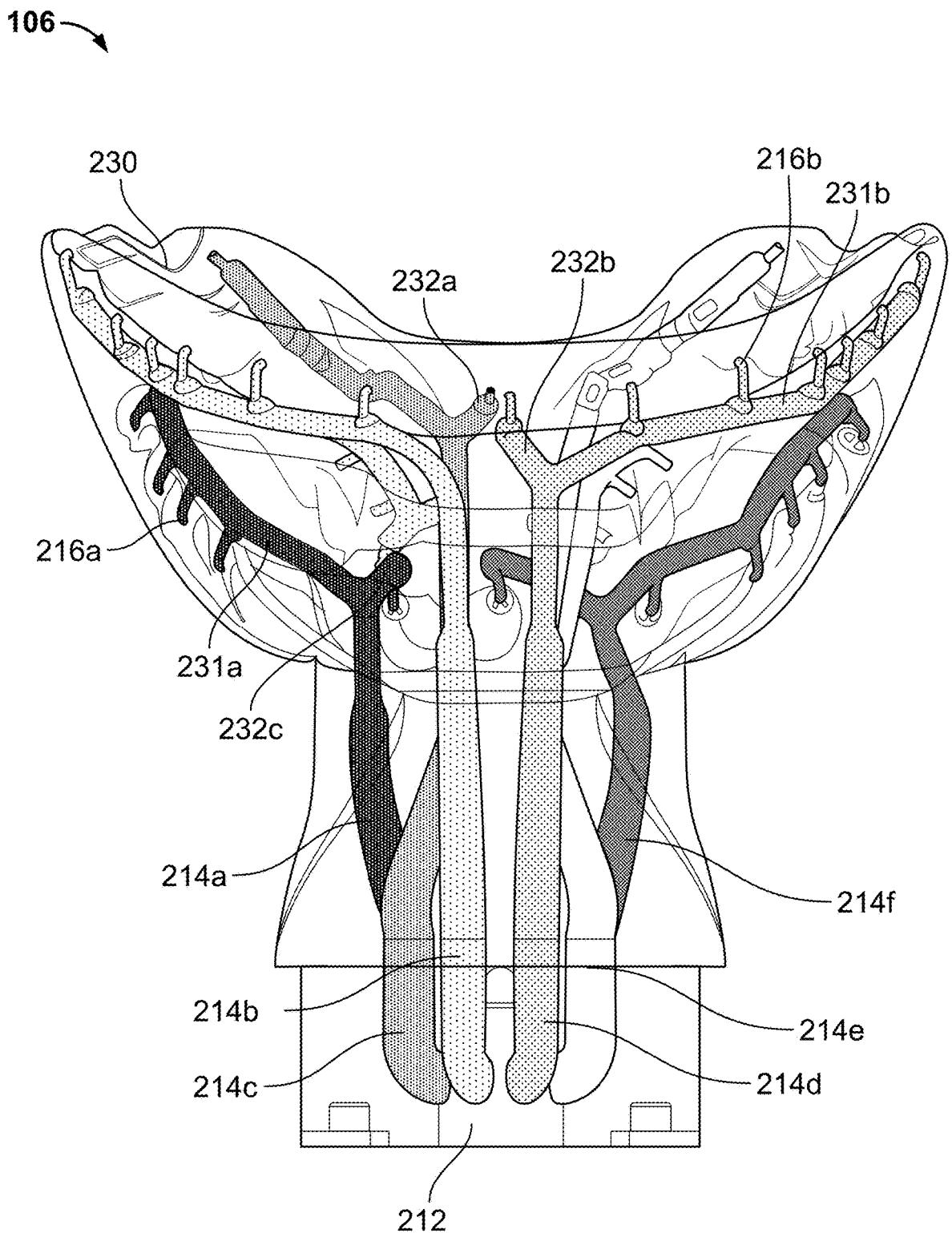
FIG. 1B depicts a schematic perspective view of a set of manifolds of an oral insert.

FIG. 1B depicts a schematic perspective view of a set of manifolds of an oral insert. The oral insert 106 may comprise a fluid inlet port 212 configured to receive fluid and a tray surface 230 configured to retain teeth (not shown). The set of manifolds 214a, 214b, 214c, 214d, 214e, 214f are configured to receive fluid from the fluid inlet port 212. Each manifold may comprise one or more trunks, such as trunks 231a, 231b and branches extending from a trunk, such as branches 232a, 232b, 232c. Fluid nozzles, such as fluid nozzles 216a, 216b may be coupled to respective trunks and branches. In some variations, the set of manifolds 214a, 214b, 214c, 214d, 214e, 214f may extend from the fluid inlet port 212 on either side of a lateral plane bisecting the central incisors (not shown). Directly connecting the trunk to the fluid nozzles corresponding to the central incisors may generate a hydraulically inefficient tortuous path for the trunk. Therefore, in some variations, a branch may be used to couple one or more of the anterior fluid nozzles to the trunk. In FIG. 1B, branches 232a, 232b, 232c extend toward fluid nozzles 216a, 216b, 216c corresponding to the anterior teeth (e.g., central incisors).

Figure 2:
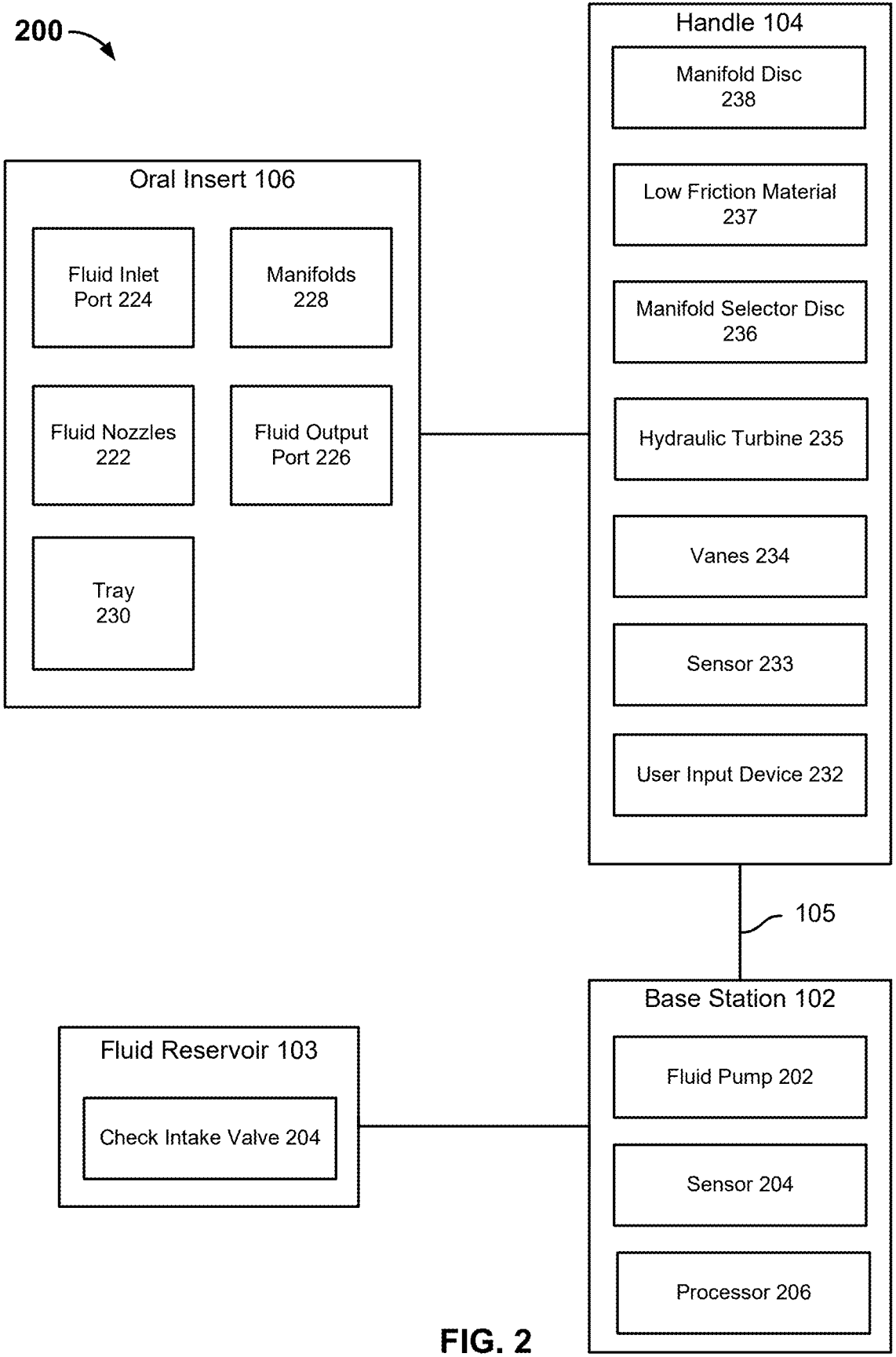
FIG. 2 is a block diagram of an oral health device for cleaning the oral anatomy of a user in accordance with some embodiments.

FIG. 2 is a block diagram of an oral health device for cleaning the oral anatomy of a user in accordance with some embodiments. Device 200 includes an oral insert 106 coupled to a fluid delivery system comprised of handle 104, fluid reservoir 103, and base station 102. Fluid reservoir 103 is releasably engaged to base station 102. Base station 102 is releasably engaged to handle 104. Handle 104 is releasably engaged to oral insert 106.

Fluid reservoir 103 includes a check intake valve 204. In some embodiments, check intake valve 204 is located off-centered from a bottom surface of fluid reservoir 103. In some embodiments, check intake valve 204 is located at a center of the bottom surface of fluid reservoir 103.

Base station 102 includes fluid pump 202. Fluid pump 202 is configured to output pressurized fluid from fluid reservoir 103 to oral insert 106 via handle 104. Fluid pump 202 is configured to output pressurized fluid such that a flow rate of the pressurized fluid at each of the fluid nozzles 202 is the same flow rate within a predetermined tolerance. To provide an oral care treatment having a particular efficacy, fluid pump 202 is configured to provide a particular flow rate of fluid having a particular amount of pressure.

In some embodiments, base station 102 includes sensor 204 configured to detect when hydraulic turbine 235 enters a stalled state. Sensor 204 may be an accelerometer. Sensor 204 is configured to output a signal having a first frequency when hydraulic turbine 235 and manifold selector disc 236 are rotating and a signal having a second frequency when hydraulic turbine 235 and manifold selector disc 236 are not rotating. Sensor 204 may be an optional feature. Processor 206 is configured to receive a signal while oral health device 200 is operating and analyze the signal from sensor 204 to determine whether hydraulic turbine 235 has entered the stalled state.

Handle 104 includes user input device 232 (e.g., a button, a switch, etc.). In response to a user input, user input device 232 is configured to activate fluid pump 202, which introduces pressurized fluid into a bottom portion of handle 104 via fluid conduit 105. The bottom portion of handle 104 includes an opening. A first side of a cone (e.g., rounded cone, spiked cone) is situated opposite to the opening. In some embodiments the cone is a right circular cone. In some embodiments, the cone is an oblique cone. The bottom portion of handle 104 includes a plurality of vanes 234. A proximal end of a vane is attached to a surface of the cone. A distal end of a vane is attached to a stationary body of the bottom portion of handle 104.

In some embodiments, the plurality of vanes 234 is straight. In some embodiments, the plurality of vanes 234 is curved. The shape of the plurality of vanes 234 causes the pressurized fluid to move in a particular direction. The velocity and acceleration associated with the pressurized fluid as it moves through the bottom portion of handle 104 depends on the degree to which the plurality of vanes 234 is curved and the dimensions associated with the plurality of vanes 234 (e.g., height, length, width). The velocity and acceleration associated with the pressurized fluid as it moves through the bottom portion of handle 104 also depends on the number of vanes 234 included in the bottom portion of handle 104. In some embodiments, the vanes 234 is comprised of a fixed vane stator and a rotating vane rotor.

A second side of the cone includes an opening (e.g., a hole). The second side of the cone is coupled to a first side of hydraulic turbine 235 via a first elongated member (e.g., rod) that extends through the opening. Hydraulic turbine 235 includes an external cylindrical structure, a plurality of blades, and an internal cylindrical body. In some embodiments, hydraulic turbine 235 is a Pelton wheel, a piston motor, or other axial turbine. A proximal end of a blade is attached to a surface of the internal cylindrical body. A distal end of a blade is attached to an inner surface of the external cylindrical structure of the hydraulic turbine.

Fluid is provided from the bottom portion of handle 104 to hydraulic turbine 235. The plurality of vanes 234 is stationary. The motion of the provided fluid causes the plurality of blades associated with hydraulic turbine 235 to rotate. The rotational speed associated with hydraulic turbine 235 is based on the degree to which the plurality of vanes 234 is curved, the dimension associated with the plurality of vanes 234, and/or a number of the plurality of vanes 234. In some embodiments, the plurality of vanes 234 cause the fluid to move in a clockwise direction. In some embodiments, the plurality of vanes 234 cause the fluid to move in a counter-clockwise direction.

A second side of hydraulic turbine 235 includes a key and a second elongated member. The second side of hydraulic turbine 235 is coupled to a first side of manifold selector disc 236 via the key. The key may have a plurality of different shapes, such as triangle, square, rectangle, rhombus, trapezoid, circle, pentagon, hexagon, etc. Manifold selector disc 236 includes an opening in the center of manifold selector disc 236. A shape and size of the opening is configured to match the key associated with the second side of hydraulic turbine 235.

In some embodiments, handle 104 includes sensor 233 configured to detect when hydraulic turbine 235 enters a stalled state. Sensor 233 may be a Hall effect sensor configured to measure the speed associated with a magnet 1104 that is included in the hydraulic turbine 235. Sensor 233 is configured to provide a signal to processor 206, which determines whether hydraulic turbine 235 has entered the stalled state based on the provided signal. Sensor 233 may be an optional feature.

In some embodiments, hydraulic turbine 235 includes a magnet 1104 located in an inner portion of the hydraulic turbine 235 and a coil 1102 on an outer portion of the hydraulic turbine 235. The coil 1102 may be powered to cause the magnet 1104 located in the inner portion of the hydraulic turbine 235 to rotate. An output from sensor 233 may be used by processor 206 to control the voltage or current used to control the speed at which the magnet 1104 rotates. In some embodiments, process 206 controls the voltage or current to cause the speed of the magnet 1104 to increase. In some embodiments, process 206 controls the voltage or current to cause the speed of the magnet 1104 to decrease. In some embodiments, process 206 controls the voltage or current to maintain the speed of the magnet 1104.

Manifold selector disc 236 includes a gateway. The gateway may have a trapezoidal shape or other shape. Manifold selector disc 236 includes a rotation balancing cutout. The rotation balancing cutout is located antipodal (diametrically opposite) to the gateway. The rotation balancing cutout has a volume that is substantially equal (within a threshold tolerance) of the volume of the gateway. This is to ensure that the manifold selector disc 236 is balanced (e.g., prevent wobble, reduce vibration) when the manifold selector disc 236 rotates. In some embodiments, the rotation balancing cutout has a thickness that is half a thickness of manifold selector disc 236. In other embodiments, the rotation balancing cutout may have other thicknesses and dimensions, so long as the volume of the rotation balancing cutout is substantially equal to the volume of the gateway.

The second elongated member of hydraulic turbine 235 is configured to fit through an opening associated with low friction material 237 and an opening of an alignment body associated with a top portion of handle 104. Low friction material 237 has a friction coefficient that is less than a threshold value. Examples of low friction material 237 include, but are not limited to, POM (PolyOxyMethylene), POM-C (Acetal Copolymer), or POM-H (Delrin).

The top portion of handle 104 includes an alignment body. The alignment body may be a pyramid, a cube, a cylinder, a rectangular cuboid, or any other shape. The alignment body includes an opening. The opening has a shape and size corresponding to the shape and size associated with the second elongated member of hydraulic turbine 235.

The top portion of handle 104 includes manifold disc 238. Low friction material 237 is situated between manifold disc 238 and manifold selector disc 236. Low friction material reduces friction between manifold disc 238 and manifold selector disc 236, and hydraulic turbine 235 to rotate manifold selector disc 236.

Low friction material 237 and manifold disc 238 both include a plurality of holes. A number of holes associated with low friction material 237 is equal to a number of holes associated with manifold disc 238. Each of the holes associated with low friction material 237 and manifold disc 238 corresponds to one of the manifolds 228 of oral insert 106.

Manifold disc 238 is comprised of a plurality of holes. The plurality of holes is arranged in a circular pattern. In some embodiments, the plurality of holes is arranged in a different pattern. The holes may be a circle, rectangle, triangle, or other type of shape. Each hole corresponds to one of the manifolds 228 of oral insert 106. Manifold selector disc 236 includes an opening having a shape and dimensions such that when one of the holes of manifold disc 238 is selected, the other non-selected holes of the manifold disc are not visible from the gateway.

During a cleaning cycle associated with oral health device 200, oral health device 200 is in a "cleaning" phase or a "transition" phase. During the "cleaning" phase, fluid is provided from hydraulic turbine 235 to a hole of the plurality of holes associated with low friction material 237 and manifold disc 238 via the gateway associated with manifold selector disc 236. The hole corresponds to a manifold of the plurality of manifolds 228 associated with the oral insert. The fluid is subsequently provided to a portion of a user's mouth that corresponds to the manifold via the plurality of fluid nozzles 222 associated with the manifold. During the "transition phase," a portion of a currently exposed hole and a portion of a subsequent exposed hole are exposed by the gateway of manifold selector disc 236. A manifold of the oral insert corresponds to the currently exposed hole and a different manifold of the oral insert corresponds to the subsequent exposed hole. Fluid is provided to the manifold of the oral insert that corresponds to the currently exposed hole and the different manifold of the oral insert that corresponds to the subsequent exposed hole when the oral health device is in the "transition" phase. The oral health device alternates between the "cleaning" phase and the "transition" phase during the cleaning cycle associated with oral health device 200. In some embodiments, the cleaning cycle associated with oral health device 200 ends when a predetermined amount of time has passed. In some embodiments, the cleaning cycle associated with oral health device 200 ends when the fluid reservoir becomes empty.

In the "on" state, fluid is provided from fluid reservoir 103 to one of the manifolds 228 via the selected hole of manifold disc 238. The configuration of manifold selector disc 236 may prevent fluid from accidentally being introduced into the other manifolds via the other non-selected holes. The pressurized fluid causes a force to be applied on manifold selector disc 236 in a direction towards manifold disc 238.

Device 200 may be in a "cleaning" phase or a "transition" phase during a cleaning cycle of device 200. During the "cleaning" phase, one of the manifolds 228 is selected and an opening of the manifold selector disc exposes a first hole of the manifold disc that corresponds to the selected manifold. Fluid pump 202 causes pressurized fluid to be provided from fluid reservoir 103 and delivered to the selected manifold via handle 104. The pressurized fluid is provided to a user's mouth via the plurality of fluid nozzles that are associated with the selected manifold.

Hydraulic turbine 235 causes manifold selector disc 236 to continuously rotate during the "cleaning" state and during the "transition" phase. Device 200 is in the "transition" phrase until the second hole of the manifold disc is completely exposed and the other holes of the manifold disc are completely covered. In some embodiments, device 200 may be in the "transition" phase for a particular amount of time (e.g., 0.10 seconds) based on the degree to which the plurality of vanes 234 is curved, the dimensions associated with the plurality of vanes 234 (e.g., height, length, width), and a number of vanes 234 included in the bottom portion of handle 104.

Fluid is continuously provided by fluid pump 202 to handle 104 when device 200 is turn on until device 200 is turned off or until there is no longer any more fluid in fluid reservoir 103.

The fluid structures defined by the oral insert 106 may comprise a fluid inlet port 224, a set of manifolds 228, a set of fluid nozzles 222, and a fluid outlet port (e.g., effluence port) 226. The oral insert 106 may define a tray 230 configured to retain teeth (e.g., upper teeth, lower teeth). The tray 230 may be configured such that at least a portion of the tray 230 corresponds to a shape of the user's teeth.

Oral insert 106 is configured to receive fluid from the fluid reservoir 103 at fluid inlet port 224. Fluid inlet port 224 is configured to be in fluid communication with the set of manifolds 228 and the set of nozzles 222. In one embodiment, oral insert 106 includes a set of 10 manifolds where each manifold includes 8 fluid nozzles. Fluid output from the set of nozzles 222 may be directed at the user's oral anatomy, for example, through the interproximal spaces between the teeth. A nozzle may be positioned at any location on a manifold. However, the nozzle position is specific to the oral structure of a user. After the fluid passes through and/or irrigates the user's oral anatomy, the fluid may then be guided to the fluid outlet port 226 to exit the user's oral cavity. In some variations, fluid may flow sequentially into fluid inlet 224 and through the set of manifolds 228 and their respective nozzles 222. The set of nozzles 222 may be configured to output fluid toward oral anatomy. Fluid outlet port 226 may then receive the fluid (e.g., effluence) and channel it away from the oral anatomy.

Figure 3A:
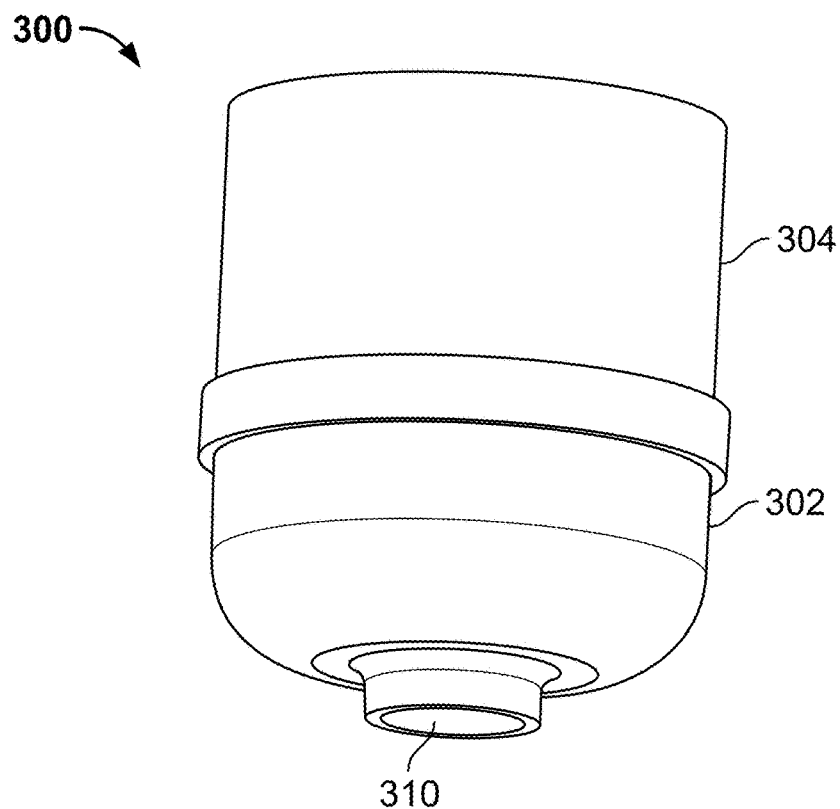
FIG. 3A depicts a perspective view of a handle in accordance with some embodiments.

FIG. 3A depicts a perspective view of a handle in accordance with some embodiments. In the example shown, handle 300 includes a bottom portion 302 and a top portion 304. The bottom portion 302 is a stationary body that includes an opening 310.

Figure 3B:
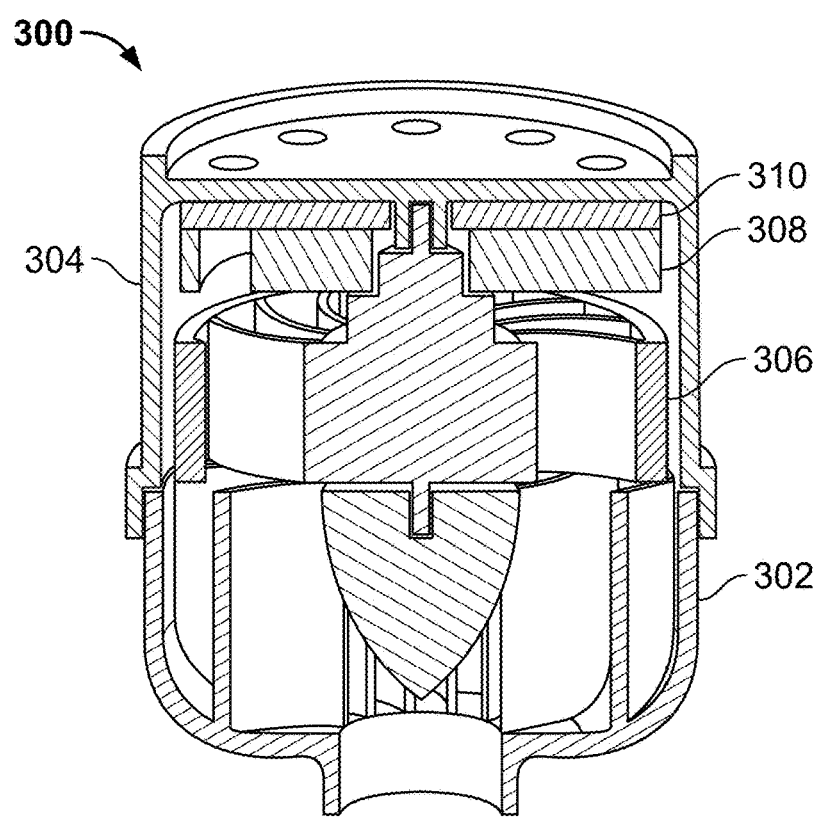
FIG. 3B depicts a cross-sectional view of a handle in accordance with some embodiments.

FIG. 3B depicts a cross-sectional view of a handle in accordance with some embodiments. In the example shown, the bottom portion 302 of handle 300 includes a plurality of vanes. The plurality of vanes is located adjacent to hydraulic turbine 306. Hydraulic turbine 306 is located adjacent to manifold selector disc 308. Manifold selector disc 308 is located adjacent to low friction material 310. A manifold disc is embedded in the top portion 304 of handle 310. Low friction material 310 is located adjacent to the manifold disc that is embedded in the top portion 304 of handle 310. Low friction material 310 reduces friction between the manifold disc that is embedded in the top portion 304 of handle 310 and manifold selector disc 308, and enables hydraulic turbine 308 to rotate manifold selector disc 308. The top portion 304 surrounds hydraulic turbine 306, manifold selector disc 308, and low friction material 310.

FIGS. 4A, 4B, and 4C depict perspective views of the bottom portion of a handle in accordance with some embodiments. In the examples shown, the bottom portion 302 of handle 300 includes opening 310. A first side of cone 414 is situated opposite to opening 310. The bottom portion 302 of handle 300 includes a plurality of vanes, such as vane 402. A proximal end of a vane is attached to a surface of cone 414. A distal end of a vane is attached to an inner surface of the exterior body of the bottom portion 302 of handle 300. A second side of cone 414 includes opening 404 (e.g., a hole).

FIGS. 5A and 5B depict perspective views of a hydraulic turbine in accordance with some embodiments. In the examples shown, hydraulic turbine 306 includes external cylindrical structure 502, a plurality of blades, such as blade 504, and internal cylindrical body 506. A proximal end of a blade is attached to a surface of internal cylindrical body 506. A distal end of a blade is attached to an inner surface of external cylindrical structure 502 of hydraulic turbine 306.

The second side of cone 414 (i.e., the face) is configured to be coupled to a first side of hydraulic turbine 306 via elongated member 516 (e.g., a rod) that extends through opening 404. Opening 404 is located at a center of the face. Hydraulic turbine 306 includes key 514 and elongated member 512. Key 514 may have a plurality of different shapes, such as a triangle, a square, a rectangle, a rhombus, a trapezoid, a circle, a pentagon, a hexagon, etc.

FIG. 6 depicts a perspective view of a manifold selector disc in accordance with some embodiments. In the example shown, manifold selector disc 308 includes opening 602 in the center of the manifold selector disc. A shape and size of opening 602 is configured to match the key 514 associated with the second side of the hydraulic turbine. When placed into key 514, manifold selector disc 308 is configured to rotate together with hydraulic turbine 306 as hydraulic turbine 306 rotates.

Manifold selector disc 308 includes gateway 604. Gateway 604 may have a trapezoidal or other shape. Low friction material 310 and the manifold disc included in the top portion 304 of handle 300 include a plurality of holes. Gateway 604 has a size and dimension such that only one of the holes of low friction material 310 and the manifold disc is fully exposed when gateway 604 is over the hole. When transitioning between holes, gateway 604 is configured to expose a portion of a previously exposed hole and a portion of a next hole to be exposed. A hole of the manifold disc may have a first state of being fully exposed, a second state of being partially exposed, or a third state of not being exposed.

Manifold selector disc 308 includes rotation balancing cutout 606. Rotation balancing cutout 606 is located antipodal (diametrically opposite) to gateway 602. Rotation balancing cutout 606 has a volume that is substantially equal (within a threshold tolerance) of the volume of gateway 604. This is to ensure that manifold selector disc 308 is balanced (e.g., prevent wobble, reduce vibration) when manifold selector disc 308 rotates.

FIGS. 7A and 7B depict perspective views of a low friction material in accordance with some embodiments. In the example shown, low friction material 310 includes a plurality of holes, such as hole 702. Low friction material 310 has a friction coefficient that is less than a threshold value. Examples of low friction material 310 include, but are not limited to, POM (PolyOxyMethylene), POM-C (Acetal Copolymer), or POM-H (Delrin). Low friction material 310 includes opening 704.

FIGS. 8A, 8B, and 8C depict perspective views of a top portion of a handle in accordance with some embodiments. In the examples shown, the top portion 302 includes a manifold disc that includes a plurality of holes, such as hole 802. The manifold disc includes an alignment body 804, which includes an opening 806. Elongated member 512 is configured to fit through opening 704 and opening 806. Alignment body 804 is configured to fit through opening 704. Opening 704 has a size and shape that is substantially equal (within a threshold tolerance) to the size and shape of alignment body 804 of the manifold disc.

Handle 300 is configured to be coupled to an oral insert that includes a plurality of manifolds and a plurality of fluid nozzles. A hole of the plurality of holes associated with low friction material 310, such as hole 702, and a hole of the plurality of holes associated with the manifold disc, such as hole 802 corresponds to a manifold of the plurality of manifolds associated with the oral insert.

FIG. 9A depicts handle components in accordance with some embodiments. FIG. 9B depicts a side view of the handle components in accordance with some embodiments. FIG. 9C depicts a top-down view of the handle components in accordance with some embodiments. FIG. 9D depicts a perspective view of the handle components in accordance with some embodiments. In the example shown, a handle may include a top portion 902, a hydraulic turbine 904, base 906, and fluid inlet 908.

Fluid enters the handle via fluid inlet 908. Base 906 includes a tube 911 that splits into a first portion 911a and a second portion 911b. The fluid is provided to the first portion 911a, the second portion 911b, and internal conduit 905. The ends of the first portion 911a and the second portion 911b are substantially vertically oriented. The fluid exiting the first portion 911a and the second portion 911b cause the hydraulic turbine 904 to rotate around internal conduit 905. Hydraulic turbine 904 includes a plurality of feature shapes, such as feature shape 907, that are affixed to a cylindrical body of hydraulic turbine 904. A feature shape may be concave, convex, or any other shape.

In some embodiments, hydraulic turbine 904 rotates around internal conduit 905 in a clockwise direction. In some embodiments, hydraulic turbine 904 rotates around internal conduit 905 is a counter-clockwise direction.

As hydraulic turbine 904 rotates, fluid radially exits hydraulic turbine 904 via opening 909. The top portion 902 includes a plurality of holes, such as hole 910. The hole above opening 909 receives the fluid after the opening 909 is below the hole. As hydraulic turbine 904 rotates, the fluid is provided to each of the plurality of holes. The delay between the fluid exiting opening 909 and the fluid entering a hole directly above opening 909 depends on the flow rate associated with the fluid and the rate at which hydraulic turbine 904 is rotating. The oral insert includes a plurality of manifold openings. Each manifold opening is associated with one of the oral insert manifolds. Each of the plurality of manifold openings is associated with one of the holes of the top portion 902. The fluid is configured to enter one of the manifold openings via one of the holes of the top portion 902.

FIG. 10A depicts handle components in accordance with some embodiments. FIG. 10B depicts a side view of the handle components in accordance with some embodiments. FIG. 10C depicts a top-down view of the handle components in accordance with some embodiments. FIG. 10D depicts a perspective view of the handle components in accordance with some embodiments.

Fluid enters the handle via fluid inlet 1008 that is located on a side portion of base 1006. Base 1006 includes an opening 1009 in which a plurality of vanes 1002 is situated. The plurality of vanes 1002 is stationary. The plurality of vanes 1002 cause the fluid to move in a particular direction as the fluid moves from the opening of the bottom portion of the handle to the hydraulic turbine 1003. In some embodiments, the plurality of vanes 1002 cause the fluid to move in a clockwise direction. In some embodiments, the plurality of vanes 1002 cause the fluid to move in a counter-clockwise direction. As the fluid transitions from the bottom portion of the handle to the hydraulic turbine 1003, the fluid movement created by the plurality of vanes 1002 causes the blades associated with the hydraulic turbine 1003 to rotate. In some embodiments, the blades associated with the hydraulic turbine rotate in a clockwise motion. In some embodiments, the blades associated with the hydraulic turbine rotate in a counter-clockwise motion.

A second side of the hydraulic turbine 1003 is coupled to a first side of a manifold selector disc 1004. The manifold selector disc 1004 includes an opening 1007 in the center of the manifold selector disc 1004. A shape and size of the opening is configured to match a key associated with the second side of the hydraulic turbine 1003. When placed into the key of the hydraulic turbine 1003, the manifold selector disc 1004 is configured to rotate together with the hydraulic turbine 1003 as the hydraulic turbine 1003 rotates.

The manifold selector disc 1004 includes a gateway 1005. The gateway 1005 may have a trapezoidal or other shape. The gateway 1005 has a size and dimension such that only one of the holes of the manifold disc is fully exposed when the gateway is over the hole. When transitioning between holes, the gateway is configured to expose a portion of a previously exposed hole and a portion of a next hole to be exposed.

The oral insert includes a plurality of manifold openings. Each manifold opening is associated with one of the oral insert manifolds. Each of the plurality of manifold openings is associated with one of the holes of the top portion 1001. The fluid is configured to enter one of the manifold openings via one of the holes of the top portion 1001.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A handle for an oral health device, comprising:
   a stationary body that includes a plurality of vanes;
   a hydraulic turbine coupled to the stationary body, wherein the stationary body is coupled to a first side of the hydraulic turbine, wherein a shape of the plurality of vanes is configured to cause the hydraulic turbine to move in a particular direction;
   a manifold selector disc coupled to a second side of the hydraulic turbine, wherein the manifold selector disc is configured to rotate when the hydraulic turbine rotates, wherein the manifold selector disc includes a gateway; and
   a manifold disc coupled to the hydraulic turbine, wherein the manifold disc includes a plurality of holes, wherein each hole of the plurality of holes is fluidly connected to a respective manifold of a plurality of manifolds associated with an oral insert.

2. The handle of claim 1, wherein, as the hydraulic turbine rotates, the manifold selector disc is configured to selectively expose, a first hole of the plurality of holes.

3. The handle of claim 2, wherein the first hole of the plurality of holes is fully exposed.

4. The handle of claim 3, wherein, as the hydraulic turbine rotates, the first hole changes from a first state of being fully exposed to a second state of being partially exposed and a second hole of the plurality of holes changes from being in a third state of not being exposed to the second state of being partially exposed.

5. The handle of claim 1, wherein the stationary body includes a first opening.

6. The handle of claim 5, wherein the first opening of the stationary body is coupled to a fluid source via a fluid conduit.

7. The handle of claim 6, wherein the stationary body includes a cone situated opposite to the first opening.

8. The handle of claim 7, wherein a proximal end of a vane of the plurality of vanes is attached to a surface of the cone.

9. The handle of claim 7, wherein a distal end of a vane of the plurality of vanes is attached to an inner surface of an exterior body of the stationary body.

10. The handle of claim 7, wherein a surface of the cone includes a second opening.

11. The handle of claim 10, wherein the hydraulic turbine includes an elongated member that is configured to fit in the second opening.

12. The handle of claim 1, wherein the hydraulic turbine further includes an external cylindrical structure and an internal cylindrical body.

13. The handle of claim 12, wherein a proximal end of a blade of the hydraulic turbine is attached to a surface of the internal cylindrical body.

14. The handle of claim 12, wherein a distal end of a blade of the hydraulic turbine is attached to an inner surface of the external cylindrical structure of the hydraulic turbine.

15. The handle of claim 1, wherein the hydraulic turbine includes a key and the manifold selector disc includes an opening.

16. The handle of claim 15, wherein the key is configured to fit into the opening of the manifold selector disc.

17. The handle of claim 1, wherein the hydraulic turbine includes an elongated member and the manifold disc includes an alignment body.

18. The handle of claim 17, wherein the alignment body includes an opening, wherein the elongated member is configured to fit through the alignment body opening.

19. The handle of claim 18, wherein the handle further includes a low friction material situated between the manifold selector disc and the manifold disc.

20. The handle of claim 19, wherein the low friction material includes a corresponding opening.

21. The handle of claim 20, wherein the elongated member is configured to fit through the corresponding opening associated with the low friction material and the alignment body opening.

22. The handle of claim 21, wherein the alignment body is configured to fit through the corresponding opening associated with the low friction material.

23. The handle of claim 1, wherein a hole associated with the plurality of holes is associated with a manifold of the plurality of manifolds included in the oral insert coupled to the handle.

24. The handle of claim 1, wherein the hydraulic turbine is a Pelton wheel, a piston motor, or axial turbine.

25. The handle of claim 1, wherein the hydraulic turbine is coupled to a magnet.

26. The handle of claim 25, wherein the magnet is utilized to determine whether the hydraulic turbine has entered into a stalled state.

27. The handle of claim 26, wherein the hydraulic turbine includes a coil on an outer portion of the hydraulic turbine and a combination of the coil and the magnet are utilized to reduce a speed associated with the hydraulic turbine.

28. The handle of claim 1, wherein the handle is coupled to a base station that includes a sensor configured to detect when the hydraulic turbine has entered into a stalled state.

* * * * *